United States Patent
Lee et al.

(10) Patent No.: US 8,285,276 B2
(45) Date of Patent: Oct. 9, 2012

(54) METHOD OF SUPPORTING MEASUREMENT IN A MOBILE COMMUNICATION SYSTEM

(75) Inventors: Young Dae Lee, Gyeonggi-do (KR); Sung Duck Chun, Gyeonggi-do (KR); Myung Cheul Jung, Gyeonggi-do (KR); Sung Jun Park, Gyeonggi-do (KR); Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 999 days.

(21) Appl. No.: 12/159,594

(22) PCT Filed: Oct. 27, 2006

(86) PCT No.: PCT/KR2006/004430
§ 371 (c)(1),
(2), (4) Date: Nov. 4, 2008

(87) PCT Pub. No.: WO2007/078045
PCT Pub. Date: Jul. 12, 2007

(65) Prior Publication Data
US 2009/0247149 A1 Oct. 1, 2009

(30) Foreign Application Priority Data
Jan. 3, 2006 (KR) .................. 10-2006-0000588

(51) Int. Cl.
*H04W 24/00* (2009.01)
(52) U.S. Cl. ........... 455/425; 455/67.13; 455/434; 455/423
(58) Field of Classification Search ............. 455/423, 455/434, 437, 452.1; 370/328, 329, 338
See application file for complete search history.

(56) References Cited

U.S. PATENT DOCUMENTS

| | | | | |
|---|---|---|---|---|
| 5,966,657 A * | 10/1999 | Sporre | ........................... | 455/425 |
| 6,044,270 A * | 3/2000 | Raith | ............................. | 455/434 |
| 6,201,996 B1 * | 3/2001 | Crater et al. | ...................... | 700/9 |
| 6,631,127 B1 * | 10/2003 | Ahmed et al. | ................ | 370/349 |
| 6,941,140 B2 * | 9/2005 | Tateson | ........................ | 455/434 |
| 8,019,332 B2 * | 9/2011 | Lee et al. | ................... | 455/422.1 |
| 8,040,811 B2 * | 10/2011 | Edwards et al. | .............. | 370/241 |

(Continued)

FOREIGN PATENT DOCUMENTS
CN 1203729 12/1998

(Continued)

OTHER PUBLICATIONS

3GPP TSG-RAN Meeting #24, Measurement rules, Jun. 2-4, 2004 www.3gpp1.org/ftp/tsgran/TSGRAN/TSGR24/Docs/PDF/RP-040208.pdf.

*Primary Examiner* — Sharad Rampuria
(74) *Attorney, Agent, or Firm* — Lee, Hong, Degerman, Kang & Waimey

(57) ABSTRACT

A method of supporting a measurement in a mobile communication system is disclosed, by which a measurement requested by a system can be smoothly performed without data loss in the course of receiving data for a specific service or control data. A UE decides a frequency or time interval necessary for measurement and then transmits information for the decided frequency or time interval to a radio network node. The radio network node controls a transmission of data to be transmitted to the UE using the received information for the frequency or time interval.

11 Claims, 3 Drawing Sheets

U.S. PATENT DOCUMENTS

| | | | |
|---|---|---|---|
| 8,054,894 B2 * | 11/2011 | Xiao et al. | 375/260 |
| 8,121,632 B2 * | 2/2012 | Sambhwani et al. | 455/525 |
| 8,194,555 B2 * | 6/2012 | Morrill et al. | 370/252 |
| 8,213,366 B2 * | 7/2012 | Kozisek et al. | 370/328 |
| 2004/0009767 A1 * | 1/2004 | Lee et al. | 455/422.1 |
| 2007/0053336 A1 * | 3/2007 | Petrovic et al. | 370/343 |
| 2009/0010219 A1 * | 1/2009 | Lee et al. | 370/329 |
| 2009/0323596 A1 * | 12/2009 | Wigren et al. | 370/329 |
| 2010/0165934 A1 * | 7/2010 | Tayloe et al. | 370/329 |

FOREIGN PATENT DOCUMENTS

| | | |
|---|---|---|
| CN | 1264529 | 8/2000 |
| EP | 1081978 A1 | 3/2001 |
| EP | 1081979 A1 | 3/2001 |
| KR | 10-2003-0019210 | 3/2003 |
| KR | 10-2005-0083085 | 8/2005 |
| WO | 0124417 A1 | 4/2001 |
| WO | 2004/100587 | 11/2004 |

* cited by examiner

METHOD OF SUPPORTING MEASUREMENT IN A MOBILE COMMUNICATION SYSTEM

CROSS-REFERENCE TO RELATED APPLICATIONS

This application is the National Stage filing under 35 U.S.C. §371 of International Application No. PCT/KR2006/004430, filed on Oct. 27, 2006, which claims the benefit of earlier filing date and right of priority to Korean Application No. 10-2006- 0000588, filed on Jan. 3, 2006.

TECHNICAL FIELD

The present invention relates to a mobile communication system, and more particularly, to a method of supporting a measurement in a mobile communication system.

BACKGROUND ART

FIG. 1 is a block diagram of a network structure of E-UMTS (evolved universal mobile telecommunications system) to which a related art and the present invention are applicable. An E-UMTS is the system evolving from the conventional UMTS and its basic standardization is currently handled by the 3GPP.

Referring to FIG. 1, an E-UMTS network includes a user equipment (hereinafter abbreviated 'UE'), a base station (hereinafter named 'eNode B') and an access gateway (hereinafter abbreviated 'AG') connected to an external network by being located at an end of the E-UMTS network. And, at least one cell can exist in one eNode B.

Layers of a radio interface protocol between UEs and a network can be classified into a first layer L1, a second layer L2 and a third layer L3 based on three lower layers of OSI (open system interconnection) reference model widely known in communication systems. A physical layer belonging to the first layer L1 offers an information transfer service using a physical channel. And, a radio resource control (hereinafter abbreviated 'RRC') located at the third layer plays a role in controlling radio resources between the UE and the network. For this, the RRC layer enables RRC messages to be exchanged between the UE and the network. And, the RRC layer can be distributively located at network nodes including an eNode B, an AG and the like or at either the Node B or the AG.

FIG. 2 is an architectural diagram of a control plane of a radio interface protocol between a UE (user equipment) and a UTRAN (UMTS terrestrial radio access network) based on the 3GPP radio access network standard. Referring to FIG. 2, a radio interface protocol vertically includes a physical layer, a data link layer, and a network layer and horizontally includes a user plane for data information transfer and a control plane for signaling transfer. The protocol layers in FIG. 2 can be divided into L1 (first layer), L2 (second layer), and L3 (third layer) based on three lower layers of the open system interconnection (OSI) standard model widely known in the communications systems.

The respective layers of a radio protocol control plane shown in FIG. 2 and a radio protocol user plane shown in FIG. 3 are explained as follows.

First of all, the physical layer as the first layer offers an information transfer service to an upper layer using a physical channel. The physical layer PHY is connected to a medium access control (hereinafter abbreviated 'MAC') layer above the physical layer via transport channels. And, data are transferred between the medium access control layer and the physical layer via the transport channels. Moreover, data are transferred between different physical layers, and more particularly, between one physical layer of a transmitting side and the other physical layer of a receiving side via the physical channel.

The medium access control (hereinafter abbreviated 'MAC') layer of the second layer offers a service to a radio link control layer above the MAC layer via a logical channel.

The radio link control (hereinafter abbreviated RLC) layer of the second layer supports reliable data transfer. A PDCP layer of the second layer performs a header compression function for reducing unnecessary control information to efficiently transmit data, which is transmitted using such an IP packet as IPv4 or IPv6, in a radio section having a relatively small bandwidth.

A radio resource control (hereinafter abbreviated 'RRC') layer located on a lowest part of the third layer is defined in the control plane only and is associated with configuration, reconfiguration and release of radio bearers (hereinafter abbreviated 'RBs') to be in charge of controlling the logical, transport and physical channels. In this case, the RB means a service offered by the second layer for the data transfer between the UE and the UTRAN.

As a downlink transport channel carrying data to UEs from the network, there is a BCH (broadcast channel) carrying system information and a downlink SCH (shared channel) carrying user traffic or control messages. The traffic or control messages of a downlink multicast or broadcast service can be transmitted via the downlink SCH or a separate downlink MCH (multicast channel). Meanwhile, as an uplink transport channel carrying data to the network from UEs, there is a RACH (random access channel) carrying an initial control message and a UL-SCH (uplink shared channel) carrying user traffic or control message.

In the related art, a network is unable to know whether a UE is able to perform a prescribed measurement. For instance, if a UE receives a multimedia broadcast/multicast service (hereinafter abbreviated MBMS) via a point-to-point radio bearer or a common control message, a network is unable to know whether the UE receives the MBMS or common control messages. So, the network is able to command the UE to perform an inter-frequency measurement while the UE is receiving the MBMS or the common control messages. However, in this case, the UE may be unable to receive a specific service while performing the inter-frequency measurement.

DISCLOSURE OF THE INVENTION

Accordingly, the present invention is directed to a method of supporting a measurement in a mobile communication system that substantially obviates one or more of the problems due to limitations and disadvantages of the related art.

An object of the present invention is to provide a method of supporting a measurement in a mobile communication system, by which a measurement requested by a system can be smoothly performed without data loss in the course of receiving data for a specific service or control data.

A UE decides a frequency or time interval necessary for measurement and then transmits information for the decided frequency or time interval to a radio network node. The radio network node controls a transmission of data to be transmitted to the UE using the received information for the frequency or time interval. The radio network node can correspond to one of a base station, a Node B, an eNode B, a base station controller and an RNC (radio network controller).

Preferably, the radio network node does not transmit data or control information for the UE during the time interval transmitted by the UE.

Preferably, the measurement is an inter-frequency measurement for measuring a power of a neighboring cell that uses a frequency band different from a currently received frequency band of the UE.

Preferably, the UE performs the inter-frequency measurement according to measurement control information provided by the radio network node.

The radio network node is able to transmit data or control information for the UE using frequency information provided by the UE.

Meanwhile, the radio network node is able to transmit data or control information for the UE during the time interval transmitted by the UE using the frequency information provided by the UE.

The radio network node is able to transmit information for allocating a frequency or time interval, which can be used by the UE for the measurement, to the UE by considering the information for the frequency or time interval transmitted by the UE.

Preferably, the UE is in an active mode to receive or be capable of receiving UE dedicated data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of supporting a measurement at a mobile terminal receiving a service from a network in a mobile communication system according to the present invention includes the steps of determining at least one of a frequency bandwidth and a time interval for performing the measurement and transmitting measurement information including the determined at least one of a frequency bandwidth and a time interval to the network.

To further achieve these and other advantages and in accordance with the purpose of the present invention, a method of supporting a measurement at a mobile terminal receiving a service from a network in a mobile communication system includes the steps of receiving measurement control information associated with the measurement from a network node, determining at least one of a frequency bandwidth and a time interval for performing the measurement, and transmitting measurement information including the determined at least one of a frequency bandwidth and a time interval.

To further achieve these and other advantages and in accordance with the purpose of the present invention, a method of supporting a measurement at a mobile terminal receiving a service from a network in a mobile communication system includes the steps of receiving measurement control information associated with the measurement from a network node, determining a frequency bandwidth for performing the measurement, and transmitting measurement information associated with the determined frequency bandwidth.

To further achieve these and other advantages and in accordance with the purpose of the present invention, a method of supporting a measurement at a network node in a mobile communication system includes the steps of transmitting a first message including measurement information associated with the measurement to a mobile terminal, receiving, from the mobile terminal, a second message including information associated with at least one of a frequency bandwidth and a time interval determined with which the mobile terminal for performing the measurement, and scheduling data for the service in consideration of the at least one of a frequency bandwidth and a time interval.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
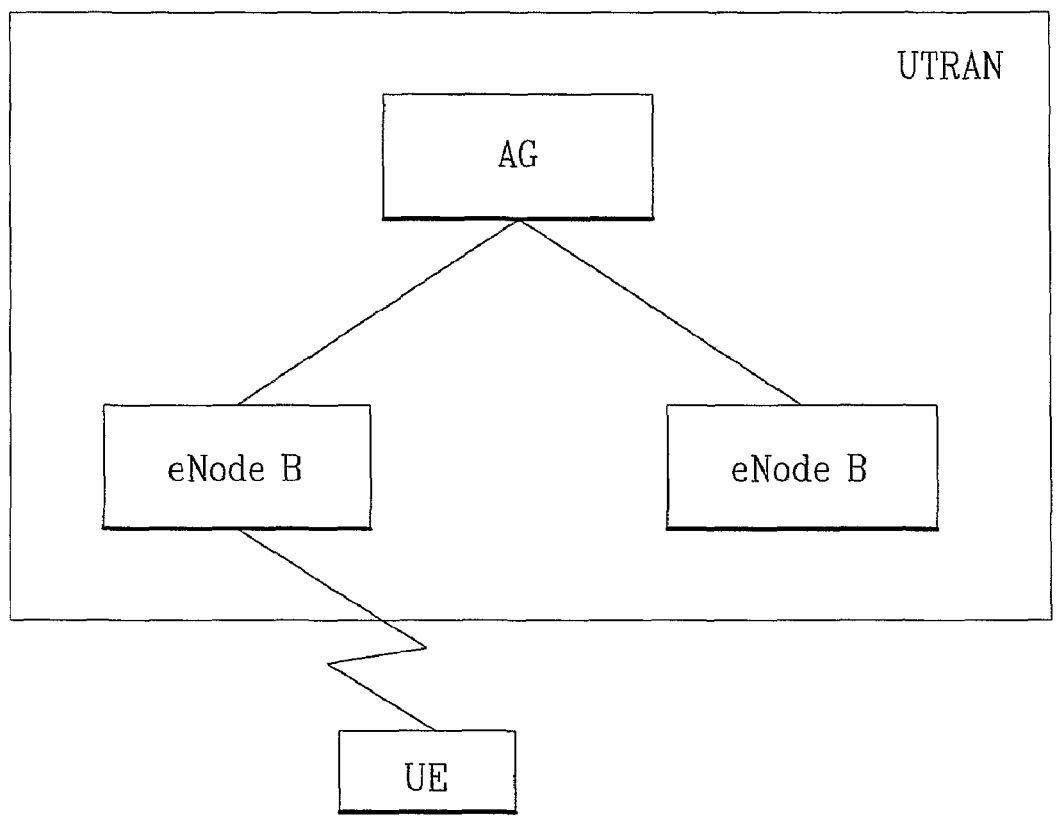
FIG. 1 is a block diagram of a network structure of E-UMTS (evolved universal mobile telecommunications system)
Figure 2:
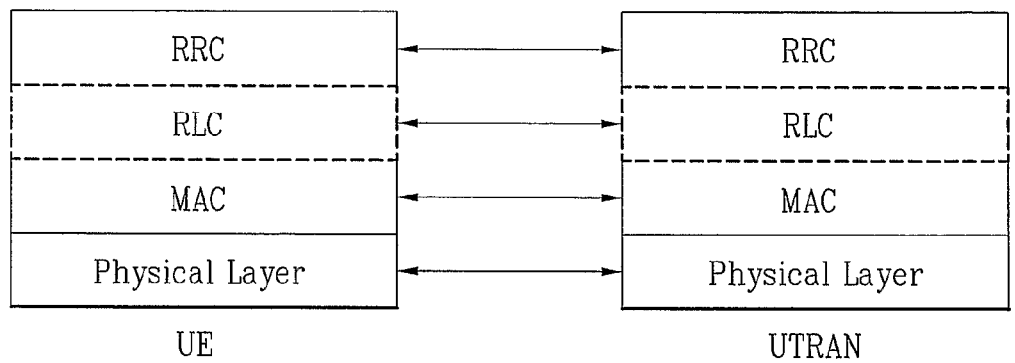
FIG. 2 is an architectural diagram of a control plane of a radio interface protocol between UE (user equipment) and UTRAN (UMTS terrestrial radio access network) based on the 3GPP radio access network standard.
Figure 3:
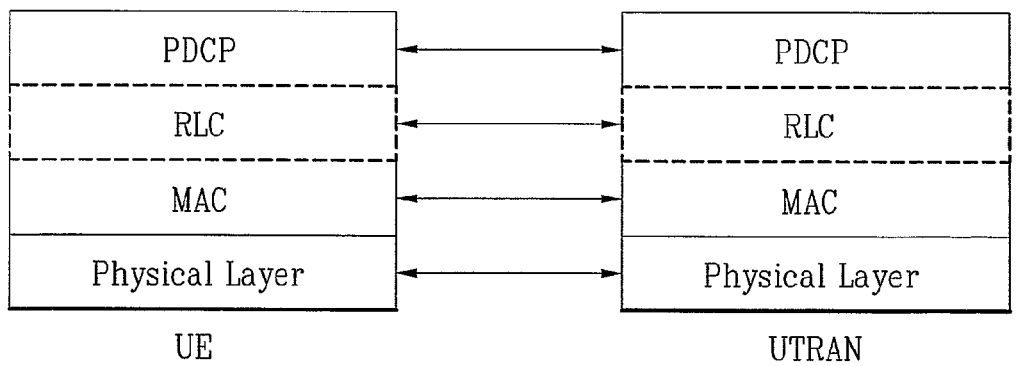
FIG. 3 is a diagram of various layers in a radio protocol user plane.
Figure 4:
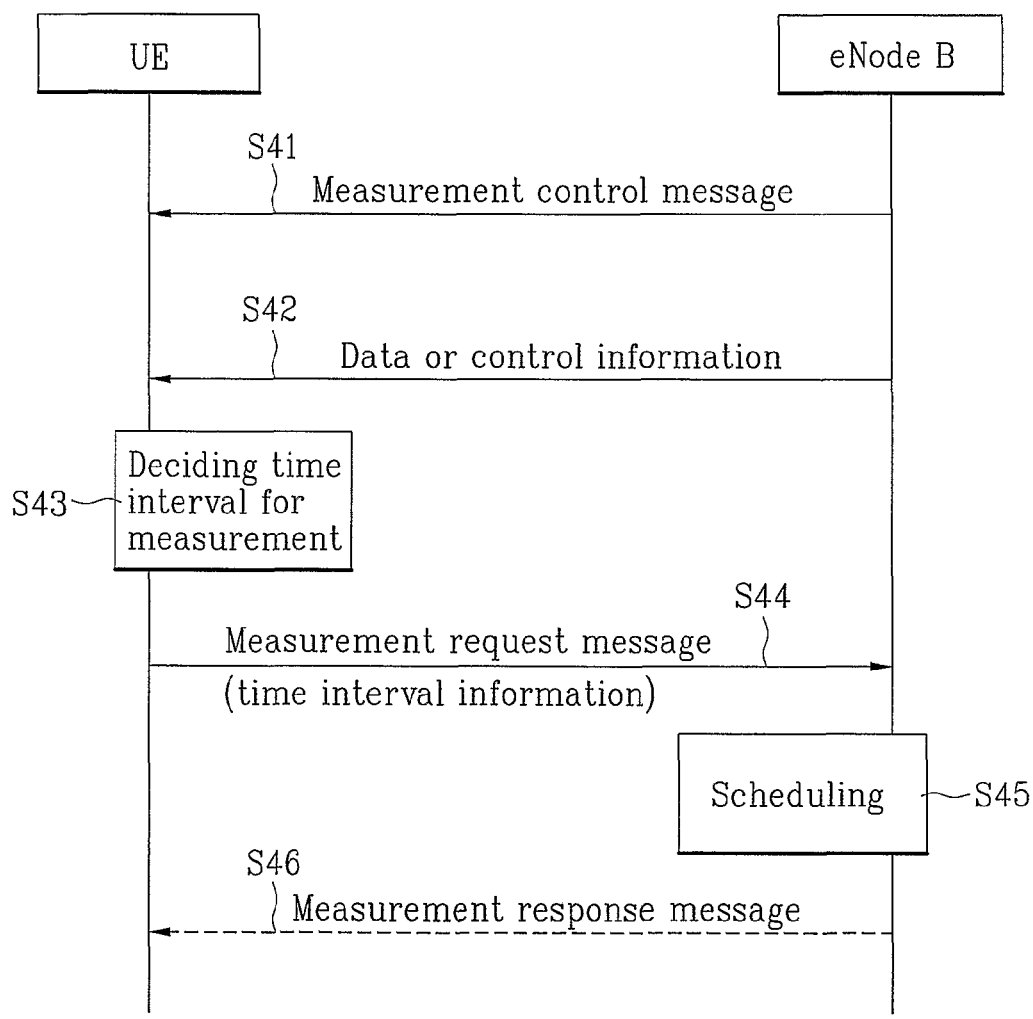
FIG. 4 is a flowchart of a method of supporting a measurement in a mobile communication system according to one preferred embodiment of the present invention.

FIG. 4 is a flowchart of a method of supporting a measurement in a mobile communication system according to one preferred embodiment of the present invention. In the embodiment shown in FIG. 4, while a UE is receiving a specific service, e.g., MBMS from a network, the network makes a request for performing an inter-frequency measurement to the UE. By the present invention, targets measurable by the UE include path loss, signal reception power, channel quality, traffic volume and the like as well as inter-frequency. Yet, more targets can be measured by the present invention.

Referring to FIG. 4, an eNode B transmits a measurement control message to a UE (S41). In this case, the measurement control message includes information for a target that should be measured by the UE. For instance, the measurement control message includes identification information for a neighbor cell as a measurement target, information for a frequency band that is being used by the neighbor cell and the like in case of inter-frequency measurement.

The measurement control message is able to further include a measurement report scheme in case of reporting to the eNode B after completion of measurement conducted by the UE, measurement associated parameters, setup information and the like. And, the measurement report scheme includes a periodic mode for periodic reports and an event mode for a report in case that a prescribed condition is met, etc.

The UE receives data associated with the specific service or control information to control a transmission of the specific service (S42). In this case, the UE is also able to receive a common control message having no relation to the specific service.

The UE decides a time interval to perform the inter-frequency measurement instructed by the eNode B using the information included in the measurement control message, the received data and the control information (S43). In particular, the UE selects a time interval capable of seamless reception of data for a currently received service, control information for the currently received service or other control data having nothing to do with the service and then decides the selected time interval as the time interval to perform the inter-frequency measurement instructed by the eNode B. If a plurality of measurement targets are included in the measurement control message, the UE is able to select a frequency band used by one neighbor cell from a plurality of the measurement targets.

Subsequently, the UE transmits information (if a frequency band is selected, information for the selected frequency is included) for the time interval to perform the measurement to the eNode B through a measurement request message (S44). For example, the UE is able to have radio parameters included in the measurement request message to transmit. In this case, the radio parameters include a volume of data the UE can process for the time interval, modulation scheme, frequency band, ARQ (auto retransmission request) parameter, channel coding, number of channels, etc. And, the measurement request message is able to further include UE capacity information.

The eNode B schedules a transmission of data for the UE using the information included in the measurement request message (S45). For instance, the eNode B is able to make the UE perform the measurement in a manner of not transmitting data to the UE during the time interval. In case that the radio parameters or UE capacity information is included in the measurement request message by the UE, the eNode B transmits data to the UE according to the radio parameters or the UE capacity information.

Meanwhile, if a frequency band of a current cell of the UE is partially overlapped with that used by the neighbor cell as a measurement target, it is able to schedule a data transmission in a manner that data shall be transmitted to the UE via a frequency band measured by the UE.

Finally, the eNode B is able to transmit a measurement response message in response to the measurement request message having been transmitted by the UE (S46). The eNode B is capable of enabling the UE-requesting measurement to be performed or stopped via the measurement response message. If the eNode B enables the UE-requesting measurement to be performed, a time interval for allowing the UE to perform the measurement can be included in the measurement response message. The eNode B is able to retransmit the measurement control message instead of sending the measurement response message. In this case, contents of the measurement response message can be included in the measurement control message. If the eNode B enables the UE-requesting measurement not to be performed, the UE is able to repeat the steps after the step S44 by selecting to transmit another time interval to the eNode B.

According to the present invention, a measurement process requested by a system can be smoothly carried out without data loss while data for a specific service or control data is being received.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to such a wireless communication system as wireless Internet, mobile communication system and the like.

The invention claimed is:

1. A method of supporting a measurement at a mobile terminal receiving a service from a network node in a mobile communication system, the method comprising:
   determining a frequency bandwidth and a time interval for performing the measurement;
   transmitting measurement information including the determined frequency bandwidth and time interval to the network node, the measurement information used to generate scheduling information by the network node to schedule the transmission of data for the mobile terminal;
   receiving the scheduling information from the network node; and
   performing the measurement in accordance with the scheduling information,
   wherein the measurement information further includes information associated with radio parameters that include a modulation and channel coding scheme, frequency band, and Automatic Retransmission Request (ARQ) parameters.

2. The method of claim 1, wherein the measurement information further includes information associated with capacity of the mobile terminal or radio parameters with which the mobile terminal performs data processing at the determined frequency band and time interval.

3. The method of claim 1, wherein the service is a point-to-multipoint service.

4. The method of claim 1, further comprising receiving measurement control information associated with the measurement from the network node.

5. The method of claim 1, further comprising receiving data or control information for the service from the network node.

6. The method of claim 5, further comprising determining the frequency bandwidth and the time interval based on the data or control information for the service.

7. The method of claim 4, wherein the measurement is an inter-frequency measurement.

8. The method of claim 7, wherein the measurement control information includes an indicator of a neighboring cell and a frequency band used by the neighboring cell.

9. The method of claim 8, wherein the measurement control information further includes a measurement report scheme, parameters related to the measurement, and configuration information.

10. The method of claim 4, wherein the network node is any one of a base station, a Node B, an eNode B, a base station controller, or a radio network controller.

11. A method of supporting a measurement at a network node in a mobile communication system, the method comprising:
   transmitting a first message including measurement control information associated with the measurement;
   receiving a second message including measurement information, the measurement information including information associated with a frequency bandwidth and a time interval determined for performing the measurement;

scheduling data for a service according to scheduling information in consideration of information associated with the frequency bandwidth and the time interval; and transmitting the scheduling information to a mobile terminal configured to perform the measurement in accordance with the scheduling information, wherein the measurement information further includes information associated with radio parameters that include a modulation and channel coding scheme, frequency band, and Automatic Retransmission Request (ARQ) parameters.

\* \* \* \* \*